No. 628,429. Patented July 4, 1899.
E. M. BENTLEY.
METHOD OF HEATING METALS BY ELECTRICITY.
(Application filed Aug. 20, 1890.)
(No Model.)
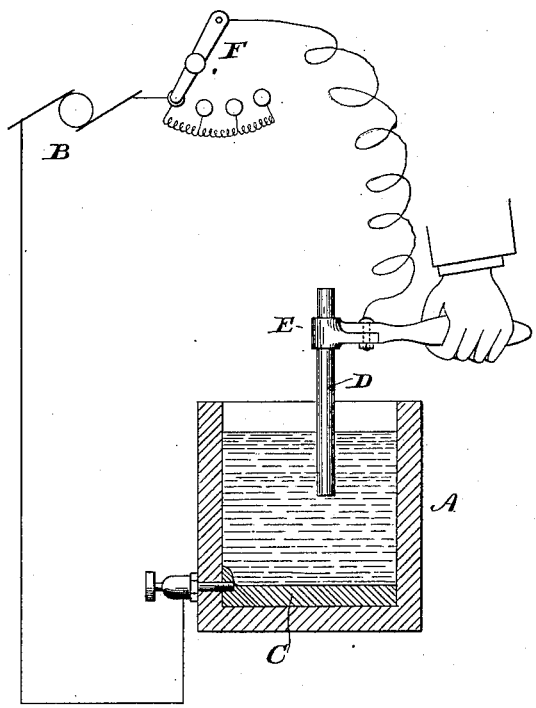
WITNESSES:
INVENTOR:
Edward M. Bentley
by Bentley & Knight
ATTYS.

UNITED STATES PATENT OFFICE.

EDWARD M. BENTLEY, OF BOSTON, MASSACHUSETTS.

METHOD OF HEATING METALS BY ELECTRICITY.

SPECIFICATION forming part of Letters Patent No. 628,429, dated July 4, 1899.

Application filed August 20, 1890. Serial No. 362,479. (No specimens.)

*To all whom it may concern:*

Be it known that I, EDWARD M. BENTLEY, a citizen of the United States, residing at Boston, county of Suffolk, State of Massachusetts, have invented certain new and useful Improvements in Methods of Heating Metals by Electricity, of which the following is a specification, reference being made to the accompanying drawing, which shows diagrammatically an apparatus for carrying my method into effect.

My invention relates to the method by which a metal, such as iron, can be conveniently heated by electricity and then hammered or otherwise shaped, as may be desired.

It has been customary to weld pieces of metal by placing them in contact and passing a current through them and pressing them together until they are united. It is impossible, however, by this method to simply heat the metal without having it adhere to an adjacent piece through which the current is conducted to it.

My invention consists in making one of the electrodes of the circuit a liquid, such as acidulated water, so that when the metal to be heated is brought in contact with it it will not adhere to the other terminal, but may be raised to any temperature desired and then removed and forged, as may be desired.

My invention will be understood by reference to the accompanying drawing, in which—

A is a receptacle of any desired form having within it a conducting liquid, such as a weak solution of hydrochloric or other acid. In the bottom of A is a metal electrode C, having a large surface, by means of which the contained liquid may be included in the circuit of generator B.

D is a bar of iron or other metal which it is desired to heat.

E is a pair of tongs having insulated handles by which the bar D is held. The tongs E are connected to the opposite terminal of the generator B.

In operation the bar D will be grasped by tongs E and inserted in the liquid and the strength of the current regulated in any suitable manner, as by a resistance F. It will be found that the lower end of bar D will become heated and even melted if the current be of sufficient strength. It may then be hammered or forged in any other way which may be desired.

The probable explanation of the result above described is that the metal to be heated has its surface adjacent to the water covered by a layer of gas produced by the decomposition of the water and that the resistance of this layer of gas through the passage of current produces an intense heat, which is communicated to the metal.

It is also to be observed that in the arrangement which I have illustrated the electrode C has a considerable superficial area, greater than that of the object to be heated, which permits of a good electrical connection between the liquid and the electrode, so that the heating effect will be largely concentrated upon said object.

It is further to be noted that the object to be heated does not form a permanent part of the electric circuit, but is temporarily connected thereto by means of the tongs, which are arranged to grip the object and enable it to be handled, while at the same time it places it in electrical connection with the main circuit.

What I claim as new, and desire to secure by Letters Patent, is—

1. The method of heating conducting material for industrial purposes, which consists in placing the material to be heated at one terminal of an electric circuit and bringing it into contact with a liquid forming the other terminal of the circuit.

2. The method of heating a conducting material for forging or other purposes, which consists in connecting it temporarily to one terminal of an electric circuit, and bringing it into contact with a non-adhering liquid electrode forming the other terminal of the circuit, so as to heat it at the point of contact with said electrode.

3. The method of heating a metal for forging or other purposes, which consists in connecting it temporarily to one terminal of an electric circuit, and bringing it into contact with a non-adhering liquid electrode forming the other terminal of the circuit, so as to heat it at the point of contact with said electrode.

4. The method of heating a metal for forging or other purposes, which consists in connecting it temporarily to one terminal of an electric circuit, and bringing it into connection with a liquid electrode forming the other terminal of the circuit.

5. The method of heating a metal for forging or other purposes, which consists in connecting it temporarily to one terminal of an electric circuit, and bringing it into contact with a non-adhering liquid electrode forming the other terminal of the circuit, so as to heat it at the point of contact with said electrode, and regulating the amount of current passing in the circuit.

6. The method of heating a conducting material for forging or other purposes, which consists in placing it in a holder connected to one terminal of an electric circuit, and bringing it into contact with a liquid electrode forming the other terminal of the circuit, so as to heat it at the point of contact with said electrode.

7. The method herein described, which consists of heating a metal by connecting it to one terminal of an electric circuit, and bringing it into contact with a liquid electrode, removing the same and then forging or otherwise treating the said metal.

8. The method of shaping an iron article which consists in placing it in temporary connection with one terminal of an electric circuit and immersing the part to be shaped in a conducting liquid forming the opposite terminal of the circuit and after the said part is heated, removing it from the liquid and shaping it to the form desired by forging.

9. The art of heating electrically-conductive bodies which consists in connecting the body to be heated to one pole of an electric generator, connecting a suitable gas-producing electrolytic bath with the other pole thereof, and then bringing the body to be heated into contact with the liquid, and developing a gaseous resistance-sheath around the same, whereby heat is localized thereon, and an arc is sprung between the liquid and the article to be heated.

10. The art of heating a part of an electrically-conducting body, which consists in connecting said body to one pole of an electric generator, intimately connecting the liquid of an electrolytic bath to the other pole of said generator and then plunging the body into the liquid but restricting the contact thereof to the particular part to be heated.

11. The art of heating an object electrically which consists in introducing into a heating-circuit, a conducting liquid having in contact with the same an electrode of large superficial area compared with the body to be heated and attaching to the source of electricity and bringing in contact with the liquid the article to be heated and thereby developing on said article a gaseous resistance-sheath operating to convert the electrical energy into heat and localize it on said article.

12. The herein-described method of concentrating the energy of an electric current upon a conducting article for forging or other purpose which consists in placing it in an electrolytic bath as an electrode with an opposite electrode of larger area and developing by the passage of an adequate current a gaseous resistance-sheath around the smaller electrode sufficient to separate said electrode from the electrolyte and by its resistance concentrate at said smaller electrode the energy of the current passing through the bath.

13. The combination with an electrolytic bath of an electrode having a large area and good contact with the electrolyte, a second electrode of smaller area having an imperfect contact with the electrolyte by reason of a gaseous resistance-sheath and a source of electricity giving a current adequate to produce the said gaseous resistance-sheath and pass through said sheath in flowing between the second electrode and the electrolyte.

In witness whereof I have signed this specification this 19th day of June, 1890.

EDWARD M. BENTLEY.

Witnesses:
N. F. HAYES,
A. O. ORNE.